(12) United States Patent
Huang et al.

(10) Patent No.: US 12,547,326 B2
(45) Date of Patent: Feb. 10, 2026

(54) ELECTRONIC DEVICE POWER MANAGEMENT

(71) Applicant: Honor Device Co., Ltd., Shenzhen (CN)

(72) Inventors: Ting Huang, Shenzhen (CN); Chen Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 105 days.

(21) Appl. No.: 18/569,839

(22) PCT Filed: Jan. 6, 2023

(86) PCT No.: PCT/CN2023/070825
§ 371 (c)(1),
(2) Date: Dec. 13, 2023

(87) PCT Pub. No.: WO2023/155636
PCT Pub. Date: Aug. 24, 2023

(65) Prior Publication Data
US 2024/0134540 A1   Apr. 25, 2024

(30) Foreign Application Priority Data
Feb. 17, 2022   (CN) .......................... 202210147403.3

(51) Int. Cl.
| | |
|---|---|
| G06F 1/00 | (2006.01) |
| G06F 3/06 | (2006.01) |
| G06F 11/30 | (2006.01) |
| H02J 7/00 | (2006.01) |

(52) U.S. Cl.
CPC .......... *G06F 3/0625* (2013.01); *G06F 3/0653* (2013.01); *G06F 3/0679* (2013.01); *H02J 7/0063* (2013.01)

(58) Field of Classification Search
CPC ......... A61C 19/06; A61C 8/0012; A61C 8/00; A61N 1/0548; A61N 1/36031; A61N 1/36034; A61N 1/205
See application file for complete search history.

(56) References Cited

U.S. PATENT DOCUMENTS

| | | | |
|---|---|---|---|
| 6,377,028 B1 * | 4/2002 | Armstrong | ............ H02J 7/0049 320/136 |
| 8,335,549 B2 | 12/2012 | Lee | |
| 10,802,736 B2 | 10/2020 | Shin et al. | |
| 11,216,058 B2 | 1/2022 | Liang | |
| 2011/0312385 A1 | 12/2011 | Lee | |

(Continued)

FOREIGN PATENT DOCUMENTS

| | | |
|---|---|---|
| CN | 102291482 A | 12/2011 |
| CN | 104461964 A | 3/2015 |

(Continued)

*Primary Examiner* — Xuxing Chen
(74) *Attorney, Agent, or Firm* — Conley Rose, P.C.

(57) ABSTRACT

An electronic device to reduce probability of file system damage when using a universal flash storage (UFS). The electronic device includes: a UFS; a battery, configured to supply power for the UFS; and a control device, configured to control the battery to stop supplying power for the UFS when duration for which a voltage of the battery is less than a preset voltage value x is greater than or equal to preset duration t, where 2.35 V<x<3 V, and 50 ms<t<1 s.

16 Claims, 3 Drawing Sheets

(56) References Cited

U.S. PATENT DOCUMENTS

| | | | |
|---|---|---|---|
| 2013/0222957 A1 | 8/2013 | Ma et al. | |
| 2016/0349831 A1* | 12/2016 | Lim | G06F 1/28 |
| 2020/0223513 A1* | 7/2020 | Ho | B62M 25/04 |
| 2021/0018975 A1* | 1/2021 | Liang | G06F 3/0625 |
| 2021/0273475 A1 | 9/2021 | Qiu et al. | |
| 2021/0291783 A1* | 9/2021 | Sakai | B60R 16/0232 |
| 2021/0399568 A1 | 12/2021 | Huang et al. | |
| 2022/0263324 A1* | 8/2022 | Sun | H02J 7/0048 |

FOREIGN PATENT DOCUMENTS

| | | | |
|---|---|---|---|
| CN | 110416643 | A | 11/2019 |
| CN | 110719624 | A | 1/2020 |
| CN | 110945456 | A | 3/2020 |
| CN | 111316528 | A | 6/2020 |
| CN | 111864287 | A | 10/2020 |
| CN | 112098864 | A | 12/2020 |
| CN | 112233709 | A | 1/2021 |
| CN | 112713626 | A | 4/2021 |
| WO | 2016082514 | A1 | 6/2016 |

* cited by examiner

Shutdown threshold of 3.5 V ─────────

Soft shutdown threshold of 3 V ─────────

Preset voltage value x ─────────

UVLO threshold of 2.35 V ─────────

ELECTRONIC DEVICE POWER MANAGEMENT

CROSS-REFERENCE TO RELATED APPLICATIONS

This is a U.S. National Stage of International Application No. PCT/CN2023/070825 filed on Jan. 6, 2023, which claims priority to Chinese Patent Application No. 202210147403.3, filed with the China National Intellectual Property Administration on Feb. 17, 2022, both of which are incorporated herein by reference in their entireties.

TECHNICAL FIELD

This application relates to the field of technologies for controlling electronic devices, and in particular, to an electronic device.

BACKGROUND

With the development of technologies, performance of electronic devices is becoming higher. Not only performance of CPUs and internal memories is becoming higher, but also performance of storage devices is becoming higher. For example, a universal flash storage (universal flash storage, UFS) is a high-performance storage device having high read and write speeds. However, when an electronic device uses a UFS, a problem of probabilistic file system damage occurs.

SUMMARY

An electronic device is provided, to reduce probability of file system damage when using a UFS.

According to a first aspect, an electronic device is provided, including: a universal flash storage UFS; a battery, configured to supply power for the UFS; and a control device, configured to control the battery to stop supplying power for the UFS when duration for which a voltage of the battery is less than a preset voltage value x is greater than or equal to preset duration t, where 2.35 V<x<3 V, and 50 ms<t<1 s.

When the voltage of the battery drops to a value less than the preset voltage value x and continues to be less than the preset voltage value x for more than the preset duration t, the battery is controlled to stop supplying power for the UFS, where 2.35 V<x<3 V, and 50 ms<t<1 s. Because x is about 2.6 V, probability of file system damage caused by operation of the UFS below the voltage threshold for a long time can be effectively reduced. In addition, because t is greater than 50 ms, a problem that the UFS frequently cannot be used normally due to erroneous triggering can be alleviated.

In a possible implementation, the control device includes: a power management module, electrically connected to the UFS and the battery, and configured to receive an input from the battery and supply power for the UFS; a coulometer, electrically connected to the battery, and configured to collect the voltage of the battery, and report an interrupt when the voltage of the battery is less than the preset voltage value x; and a control module, electrically connected to the coulometer and the power management module, and configured to obtain the interrupt reported by the coulometer, and when determining based on the interrupt reported by the coulometer that the duration for which the voltage of the battery is less than the preset voltage value x is greater than or equal to the preset duration t, control the power management module to stop supplying power for the UFS. For the electronic device, monitoring the voltage of the battery through the interrupt-based manner can provide a more timely response to protect the UFS, to avoid a problem that the voltage of the battery cannot be continuously detected when the electronic device is dormant or in other scenarios.

In a possible implementation, the reporting the interrupt includes: setting a value in an interrupt register to an interrupt indication; and the control module is specifically configured to: when the value in the interrupt register changes from a non-interrupt indication to the interrupt indication, determine that one interrupt is obtained; set the value in the interrupt register to the non-interrupt indication after a preset interval time A; and when total duration of B consecutive interrupts obtained is less than or equal to the preset duration t, control the power management module to stop supplying power for the UFS, where B>1.

In a possible implementation, (B−1)×A≤t<B×A. This can improve accuracy of determining the voltage of the battery.

In a possible implementation, 2.5 V<x<2.8 V. Through the setting of x to be closer to 2.6 V, the problem of file system damage caused by operation of the UFS below 2.6 V for a long time can be further alleviated.

In a possible implementation, x=2.6 V.
In a possible implementation, t=100 ms.
In a possible implementation, B=3.

In a possible implementation, the electronic device includes a system load, and the system load includes the UFS; the power management module is electrically connected to the system load, and the power management module is configured to supply power for the system load; and the controlling the power management module to stop supplying power for the UFS comprises: controlling the power management module to stop supplying power for the system load. Because 50 ms<t<1 s, the power management module is not triggered to stop supplying power for the system load, even if the voltage of the battery drops for a short period of less than 50 ms. In other words, a problem that the system load frequently cannot be used due to erroneous triggering is avoided.

In a possible implementation, the controlling the power management module to stop supplying power for the system load comprises: triggering the electronic device to enter a shutdown process. Because 50 ms<t<1 s, shutdown of the electronic device is not triggered, even if the voltage of the battery drops for a short period of less than 50 ms. In other words, frequent shutdown of the electronic device caused by erroneous triggering is avoided.

In a possible implementation, the controlling the power management module to stop supplying power for the system load comprises: triggering the electronic device to enter a shipping mode shipmode.

DESCRIPTION OF EMBODIMENTS

Terms used in the description of embodiments of this application are merely used to explain specific embodiments of this application, and are not intended to limit this application.

Before embodiments of this application are described, conventional technologies and problems of the conventional technologies in embodiments of this application are first described. Occurrence of probabilistic file system damage when a UFS is used is due to operation of the UFS at a low operating voltage for a long time. For example, when operating below 2.6 V for more than 100 ms, the UFS will have problems in this operating environment, and file system damage may occur. In addition, an electronic device is equipped with an under voltage lock out (Under Voltage Lock Out, UVLO) mechanism configured to protect hardware in the electronic device. A UVLO threshold voltage is 2.35 V, and UVLO threshold duration is 5 μs. To be specific, when a battery voltage drops below 2.35 V for 5 μs, power failure protection is immediately triggered for system hardware. In addition, a soft shutdown threshold of 3 V and a shutdown threshold of 3.45 V are further set in the electronic device. If the battery voltage drops to 3.45 V or 3 V for a long time, a corresponding shutdown or soft shutdown operation is performed. The soft shutdown threshold of 3 V and the shutdown threshold of 3.45 V are for purpose of implementing automatic shutdown at a low battery level, and the UVLO mechanism is for purpose of protecting the hardware when the battery voltage drops. The occurrence of probabilistic file system damage when the UFS is used is exactly due to a drop of the battery voltage. Therefore, to resolve the problem of file system damage caused by the UFS, UVLO can be used to protect the UFS. For example, the UVLO threshold voltage is increased to 2.6 V. To be specific, when the battery voltage drops below 2.6 V for 5 μs, power failure protection is triggered for the system hardware, so that the hardware protection function of UVLO can protect the UFS. In other words, when the battery voltage drops, operation of the UFS is directly stopped. However, this brings about a new problem. Some normal device functions such as a speaker SPEAKER or a global system for mobile communications (Global System for Mobile communications, GSM) in a mobile phone may cause a battery to drop below 2.6 V and above 2.35 V for duration of about a hundred μs. Although the voltage is lower than 2.6 V, the UFS does not experience file system damage, because the duration is short. However, in this case, shutdown of the electronic device is still erroneously triggered. In other words, this manner is likely to erroneously trigger the shutdown of the electronic device, affecting user experience.

To resolve the above problems, technical solutions provided in embodiments of this application are described below.

Figures 1, 2:
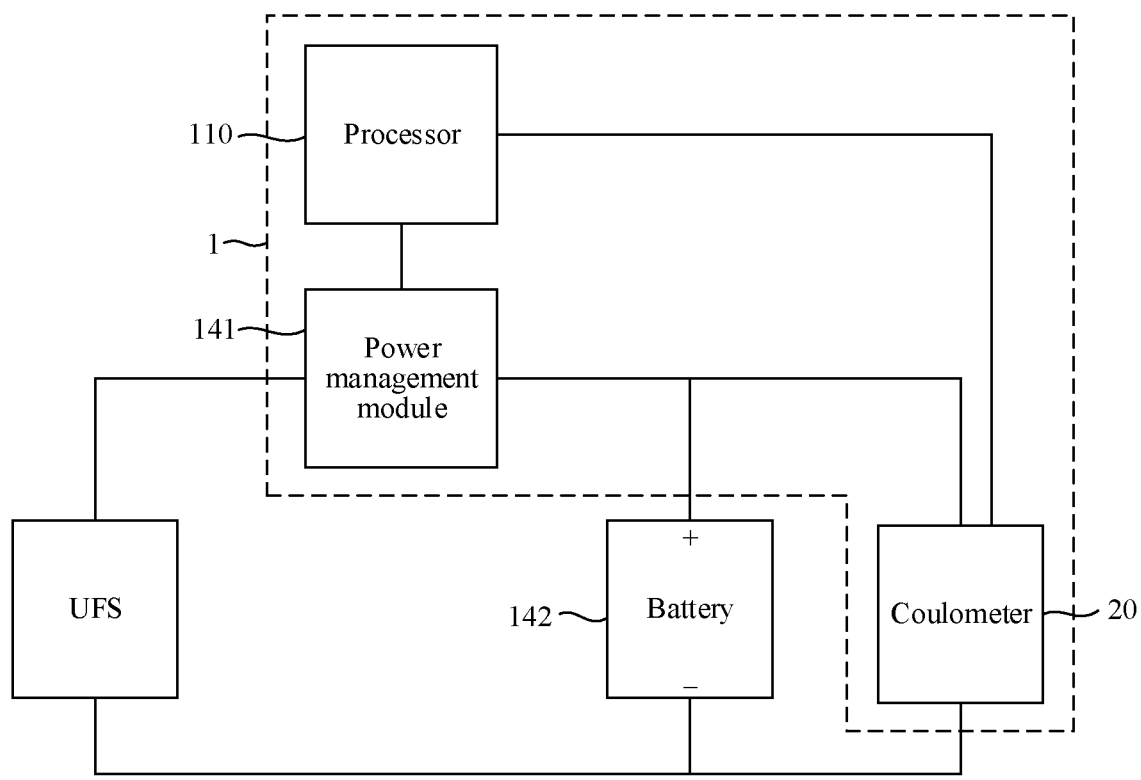
FIG. 1 is a structural block diagram of an electronic device according to an embodiment of this application.
FIG. 2 is a schematic diagram of a relationship between shutdown thresholds of an electronic device under different mechanisms according to an embodiment of this application.

First, the electronic device in embodiments of this application is described. FIG. 1 is a schematic structural diagram of an electronic device 100.

The electronic device may include a processor 110, a power management module 141, a battery 142, a universal flash storage (universal flash storage, UFS), and the like. It may be understood that the structure shown in this embodiment of the present invention does not constitute a specific limitation on the electronic device. In some other embodiments of this application, the electronic device may include more or fewer components than those shown in the figure, or some components may be combined, or some components may be divided, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU), etc. Different processing units may be separate components, or may be integrated into one or more processors.

The controller may generate an operation control signal based on an instruction operation code and a timing signal, and implement control on instruction fetching and instruction execution.

A memory configured to store instructions and data may be further disposed in the processor 110. In some embodiments, the memory in the processor 110 is a cache. The memory may store an instruction or data that is recently used or to be cyclically used by the processor 110. When needing to use the instruction or the data again, the processor 110 may directly call the instruction or the data from the memory. This avoids repeated accessing and reduces a wait time for the processor 110, thereby improving system efficiency.

The power management module 141 is configured to connect to the battery 142 and the processor 110. The power management module 141 receives an input from the battery 142 and/or other inputs, to supply power for the processor 110 and the like. The power management module 141 may further be configured to monitor parameters such as a battery capacity, a quantity of battery cycles, and a battery health status (power leakage and impedance). In some other embodiments, the power management module 141 may alternatively be disposed in the processor 110.

The UFS or other memories may be configured to store computer-executable program code. The executable program code includes instructions. The UFS or other memories may include a program storage area and a data storage area. The program storage area may store an operating system, an application program required by at least one function (for example, a sound playback function and an image display function), and the like. The data storage area may store data (for example, audio data or an address book) and the like created during use of the electronic device. The processor 110 runs the instructions stored in the UFS or other memories, and/or the instructions stored in the memory disposed in the processor, to execute various functional applications and data processing of the electronic device.

An embodiment of this application provides an electronic device, including: a universal flash memory UFS; a battery 142, where the battery 142 is configured to supply power for the UFS; and a control device 1. The control device 1 is configured to control the battery 142 to stop supplying power for the UFS when duration for which a voltage of the battery 142 is less than a preset voltage value x is greater than or equal to preset duration t, where 2.35 V<x<3 V, and 50 ms<t<1 s.

Specifically, as shown in FIG. 2, an embodiment of this application provides a UFS protection mechanism independent of UVLO to protect the UFS. A voltage threshold of the UFS protection mechanism is the preset voltage value x, and the preset voltage value x is 3 V to 2.35 V. This can avoid file system damage caused by operation of the UFS below the voltage threshold for a long time. Because the preset voltage value x is lower than a shutdown threshold of 3.5 V and a soft shutdown threshold of 3 V, the UFS protection mechanism does not conflict with an existing shutdown mechanism. In addition, because the preset voltage value x is higher than 2.35 V, the UFS protection mechanism does not conflict with the existing UVLO mechanism. Threshold duration of the UFS protection mechanism is greater than 50 ms. Therefore, during normal operation of the electronic device, even if the voltage of the battery 142 drops for a short period of less than 50 ms, protection for the UFS is not erroneously triggered. In other words, frequent power-off of the UFS caused by erroneous triggering is avoided.

According to the electronic device in this embodiment of this application, when the voltage of the battery drops to a value less than the preset voltage value x and continues to be less than the preset voltage value x for more than the preset duration t, the battery is controlled to stop supplying power for the UFS, where 2.35 V<x<3 V, and 50 ms<t<1 s. Because x is about 2.6 V, probability of file system damage caused by operation of the UFS below the voltage threshold for a long time can be effectively reduced. In addition, because t is greater than 50 ms, a problem that the UFS frequently cannot be used normally due to erroneous triggering can be alleviated.

In a possible implementation, 2.5 V<x<2.8 V. Through the setting of x to be closer to 2.6 V, the problem of file system damage caused by operation of the UFS below 2.6 V for a long time can be further alleviated.

In a possible implementation, x=2.6 V.

In a possible implementation, the control device 1 includes a power management module 141. The power management module 141 is electrically connected to the UFS and the battery 142. The power management module 141 is configured to receive an input from the battery 142, to supply power for the UFS. The control device 1 further includes a coulometer 20. The coulometer 20 is electrically connected to the battery 142. The coulometer 20 is configured to collect the voltage of the battery 142, and report an interrupt when the voltage of the battery 142 is less than the preset voltage value x. The control device 1 further includes a control module 10. The control module 10 is electrically connected to the coulometer 20 and the power management module 141. The control module 10 is configured to obtain the interrupt reported by the coulometer 20, and when determining based on the interrupt reported by the coulometer 20 that the duration for which the voltage of the battery 142 is less than the preset voltage value x is greater than or equal to the preset duration t, control the power management module 141 to stop supplying power for the UFS. The coulometer 20 continuously collect the voltage of the battery 142. When determining that the voltage of the battery 142 is lower than the preset voltage value x, the coulometer 20 reports an interrupt, and then continues to collect the voltage of the battery 142. Therefore, the control module 10 may determine based on the interrupt reported by the coulometer 20 whether the duration for which the voltage of the battery 142 is less than the preset voltage value x is greater than or equal to the preset time t. For the electronic device, monitoring the voltage of the battery 142 through the interrupt-based manner can provide a more timely response to protect the UFS, to avoid a problem that the voltage of the battery cannot be continuously detected when the electronic device is dormant or in other scenarios.

In a possible implementation, the reporting the interrupt comprises: setting a value in an interrupt register to an interrupt indication. The control module 10 is specifically configured to: when the value in the interrupt register changes from a non-interrupt indication to the interrupt indication, determine that one interrupt is obtained; set the value in the interrupt register to the non-interrupt indication after a preset interval time A; and when total duration of B consecutive interrupts obtained is less than or equal to the preset duration t, control the power management module 141 to stop supplying power for the UFS, where B>1.

Figure 3:
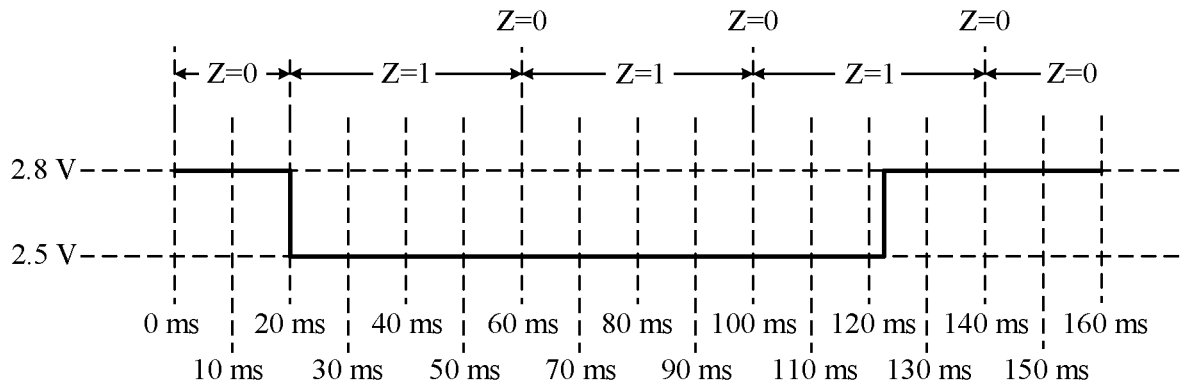
FIG. 3 is a schematic diagram of a relationship between a voltage curve of a battery and a value in an interrupt register according to an embodiment of this application.

For example, x=2.6 V, t=100 ms, B=3, and A=40 ms. As shown in FIG. 3, Z is used for representing the value in the interrupt register. Z=1 means that the value in the interrupt register is the interrupt indication. Z=0 means that the value in the interrupt register is the non-interrupt indication. Assuming that the voltage of the battery is 2.8 V between 0 ms and 20 ms, the coulometer 20 does not report an interrupt during this period. Therefore, Z=0. At 20 ms, the voltage of the battery drops to 2.5 V. At this moment, a battery voltage sampled by the coulometer 20 is less than 2.6 V. Therefore, the coulometer 20 reports an interrupt, and Z is set to 1. In other words, the value in the interrupt register is changed from the non-interrupt indication to the interrupt indication. In this case, the control module 10 determines that one interrupt is obtained. Assuming that the preset interval time A is 40 ms, the control module 10 performs an interrupt clearing operation after an interval of 40 ms, that is, at 60 ms, to be specific, resets the value in the interrupt register to the non-interrupt indication, in other words, sets Z to 0. At this moment, because the battery sampled by the coulometer 20 is at a microsecond level, and the voltage of the battery is still 2.5 V, the coulometer 20 immediately reports another interrupt, and Z is set to 1. In other words, the value in the interrupt register is changed from the non-interrupt indication to the interrupt indication again. In this case, the control module 10 determines that a second interrupt is obtained. After the preset interval of 40 ms, that is, at 100 ms, the control module 10 performs the interrupt clearing operation, to be specific, sets Z to 0. At this moment, because the voltage of the battery is still 2.5 V, the coulometer 20 reports an interrupt, and Z is set to 1. In other words, the value in the interrupt register is changed from the non-terminal indication to the interrupt indication for the third time. The control module 10 determines that a third interrupt is obtained. The three consecutive interrupts are obtained at 20 ms, 60 ms, and 100 ms respectively. Total duration of the three interrupts is 80 ms, which is less than the preset duration of 100 ms. That is, it is considered that duration for which the voltage of the battery is less than 2.6 V is greater than or equal to 100 ms. Specific values of A and B may be set as required. A and B are negatively correlated. To be specific, a smaller A indicates a larger B.

Figure 4:
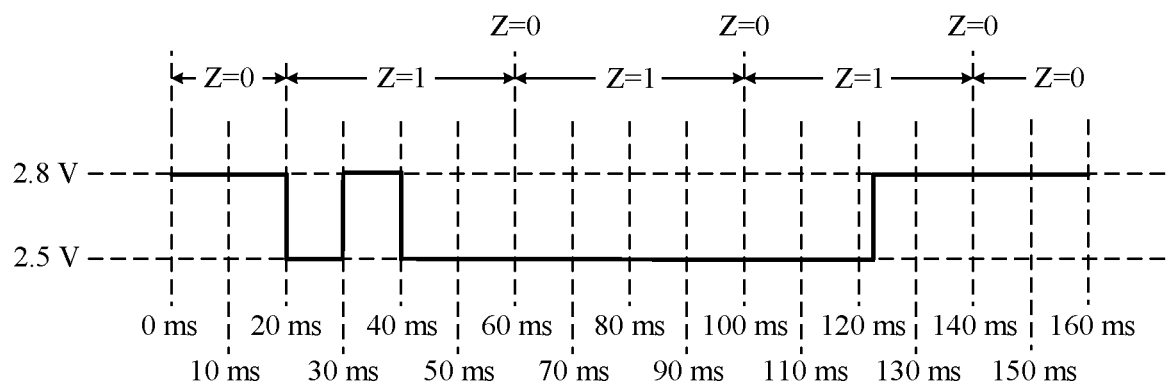
FIG. 4 is another schematic diagram of a relationship between a voltage curve of a battery and a value in an interrupt register according to an embodiment of this application.

A larger B indicates more accurate determining of the voltage of the battery. This can reduce the probability of erroneous determining. For example, as shown in FIG. 4, the following setting is still used: x=2.6 V, t=100 ms, A=40 ms, and B=3. The voltage of the battery is 2.8 V between 0 ms and 20 ms, and the coulometer 20 does not report an interrupt during this period. Therefore, Z=0. At 20 ms, the voltage of the battery drops to 2.5 V. At this moment, a battery voltage sampled by the coulometer 20 is less than 2.6 V. Therefore, the coulometer 20 reports an interrupt, and Z is set to 1. In other words, the value in the interrupt register is changed from the non-interrupt indication to the interrupt indication. In this case, the control module 10 determines that one interrupt is obtained. The voltage of the battery changes to 2.8 V during a period between 30 ms and 40 ms, and then changes back to 2.5 V. Because interrupt clearing is not performed in this period, the value in the interrupt register remains unchanged. After an interval of 40 ms since the value in the interrupt register is changed from the non-interrupt indication to the interrupt indication, that is, at 60 ms, the control module 10 performs the interrupt clearing operation, to be specific, resets the value in the interrupt register to the non-interrupt indication, in other words, sets Z to 0. At this moment, because the battery sampled by the coulometer 20 is at a microsecond level, and the voltage of the battery is still 2.5 V, the coulometer 20 immediately reports another interrupt, and Z is set to 1. In other words, the value in the interrupt register is changed from the non-interrupt indication to the interrupt indication again. In this case, the control module 10 determines that a second interrupt is obtained. After the preset interval of 40 ms, that is, at 100 ms, the control module 10 performs the interrupt clearing operation, to be specific, sets Z to 0. At this moment, because the voltage of the battery is still 2.5 V, the coulometer 20 reports an interrupt, and Z is set to 1. In other words, the value in the interrupt register is changed from the non-terminal indication to the interrupt indication for the third time. The control module 10 determines that a third interrupt is obtained. The three consecutive interrupts are obtained at 20 ms, 60 ms, and 100 ms respectively. Total duration of the three interrupts is 80 ms, which is less than the preset duration of 100 ms. Therefore, this case is erroneously determined as that the duration for which the voltage of the battery is less than 2.6 V is greater than or equal to 100 ms.

Figure 5:
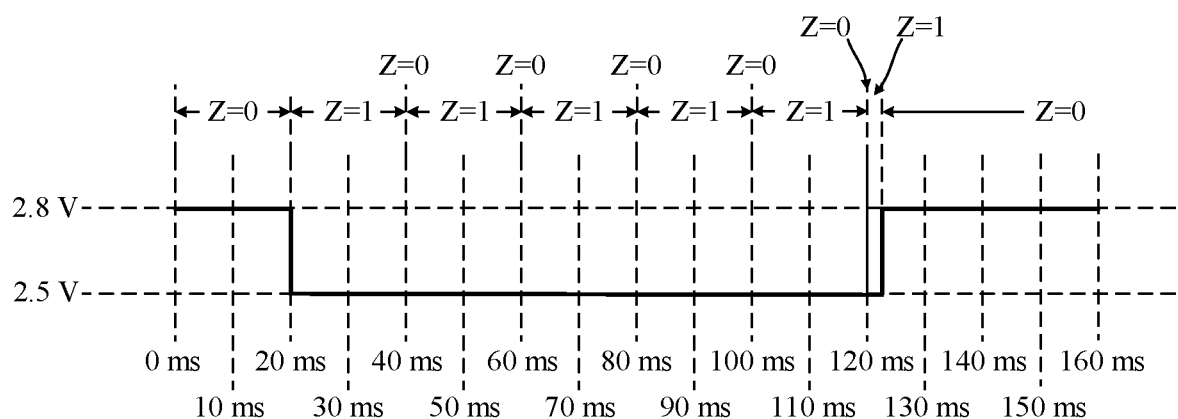
FIG. 5 is another schematic diagram of a relationship between a voltage curve of a battery and a value in an interrupt register according to an embodiment of this application.
Figure 6:
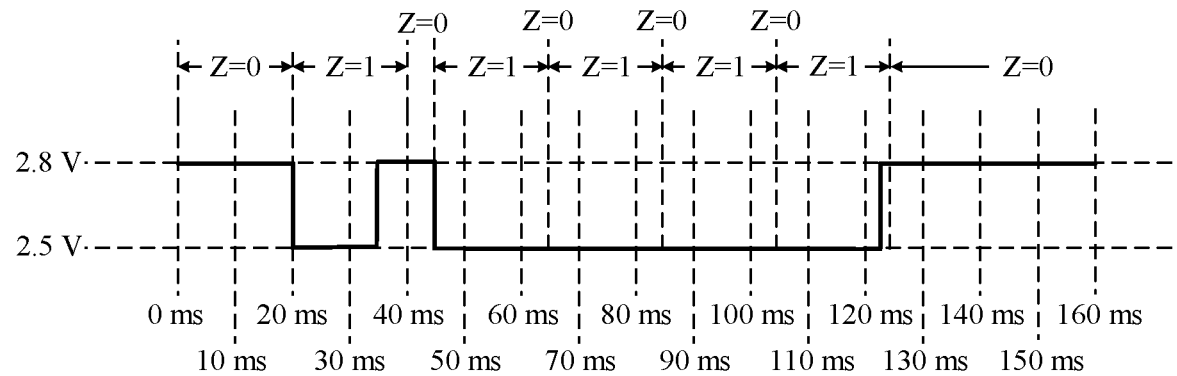
FIG. 6 is another schematic diagram of a relationship between a voltage curve of a battery and a value in an interrupt register according to an embodiment of this application.

Therefore, to improve accuracy of determining the voltage of the battery, the value of A may be decreased. A smaller value of A indicates more accurate determining. For example, as shown in FIG. 5, the following setting is used: x=2.6 V, 1=100 ms, A=20 ms, and B=6. When a battery voltage curve is the same as a battery voltage curve shown in FIG. 3, a value of Z changes from 0 to 1 at six positions: 20 ms, 40 ms, 60 ms, 80 ms, 100 ms, and 120 ms. To be specific, total duration of six consecutive interrupts obtained is 100 ms, which is equal to the preset duration of 100 ms. Therefore, it is still determined that the duration for which the battery voltage is less than 2.6 V is greater than or equal to 100 ms. As shown in FIG. 6, when a battery voltage curve is the same as a battery voltage curve shown in FIG. 4, a value of Z changes from 0 to 1 at six positions: 20 ms, 45 ms, 65 ms, 85 ms, 105 ms, and 125 ms. To be specific, total duration of six consecutive interrupts obtained is 105 ms, which is greater than the preset duration of 100 ms. Therefore, it is determined that the duration for which the battery voltage is less than 2.6 V is not greater than or equal to 100 ms. Therefore, the accuracy of determining the voltage of the battery can be improved by decreasing the value of A.

In addition, it can be seen that as the value of A decreases, that is, as the interrupt clearing operation is performed at a shorter interval, the value of Z changes from 0 to 1 more frequently within the duration for which the voltage of the battery is 2.5 V, in other words, more interrupts may be obtained within the same duration. Therefore, if the value of A decreases and the value oft remains unchanged, the value of B should be increased, to improve the accuracy of determining the voltage of the battery. When B, A, and t satisfy a relationship of $(B-1) \times A \leq t < B \times A$, high accuracy of determining the voltage of the battery is achieved.

Figure 7:
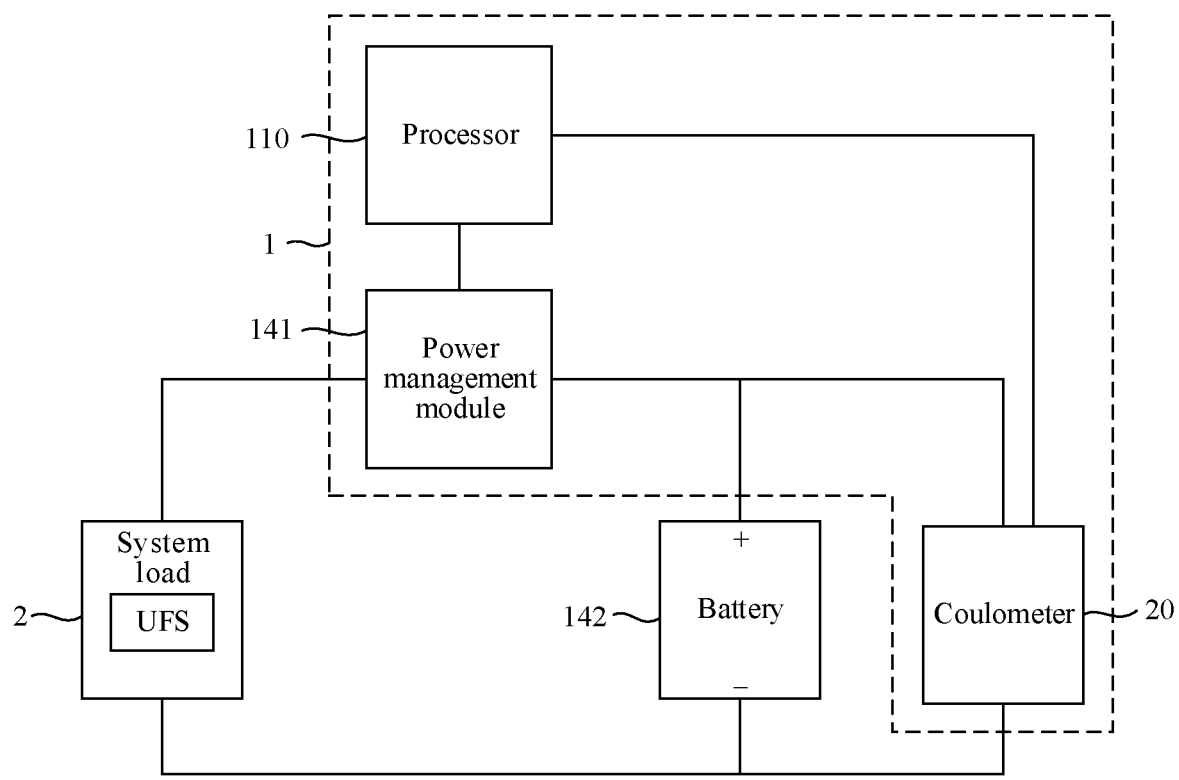
FIG. 7 is a structural block diagram of another electronic device according to an embodiment of this application.

In a possible implementation, as shown in FIG. 7, the electronic device includes a system load 2. The system load 2 includes the UFS. In addition to the UFS, the system load 2 may include a display and other load devices. The power management module 141 is electrically connected to the system load 2, and the power management module 141 is configured to supply power for the system load 2. The controlling the power management module 141 to stop supplying power for the UFS comprises: controlling the power management module 141 to stop supplying power for the system load 2.

Specifically, in the electronic device, due to specific circuit setting requirements, the power management module 141 may need to supply power for the system loads 2 including the UFS at the same time. In this case, when it is determined that the duration for which the voltage of the battery 142 is less than the preset voltage value x is greater than or equal to the preset time t, the battery 142 is controlled to stop supplying power for the system loads 2, thereby protecting the UFS.

In a possible implementation, the controlling the power management module 141 to stop supplying power for the system load 2 comprises: triggering the electronic device to enter a shutdown process. In other words, the protection of the UFS may be achieved by triggering shutdown of the electronic device. Because 50 ms<t<1 s, shutdown of the electronic device is not triggered, even if the voltage of the battery 142 drops for a short period of less than 50 ms. In other words, frequent shutdown of the electronic device caused by erroneous triggering is avoided.

In a possible implementation, the controlling the power management module 141 to stop supplying power for the system load 2 comprises: triggering the electronic device to enter a shipping mode shipmode. In the shipping mode, the battery 142 no longer supplies power for the system load 2, thereby reducing power consumption of the battery. Therefore, the protection of the UFS may be achieved by triggering the shipping mode.

The electronic device 100 in embodiments of this application may be, for example, a mobile phone, a tablet computer, a watch, a band, or other electronic products.

In embodiments of this application, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists. A and B may be singular or plural. The character "/" usually indicates an "or" relationship between the associated objects. "At least one of the following" and similar expressions refer to any combination of these items, including a single item or any combination of a plurality of items. For example, at least one of a, b, and c may indicate a, b, c, a-b, a-c, b-c, or a-b-c, where a, b, and c may be singular or plural.

The foregoing descriptions are merely preferred embodiments of this application, and are not intended to limit this application. A person skilled in the art may make various modifications and changes to this application. Any modification, equivalent replacement, improvement, and the like made without departing from the spirit and the principle of this application shall fall within the protection scope of this application.

What is claimed is:

1. An electronic device, comprising:
   a universal flash storage (UFS);
   a battery coupled to the UFS, wherein the battery is configured to supply power to the UFS; and
   a control device coupled to the battery and the UFS, wherein the control device is configured to receive an input from the battery and control the battery to supply power to the UFS,
   wherein the control device comprises a coulometer electrically connected to the battery and configured to:
      sense a voltage of the battery; and
      obtain an interrupt when the voltage of the battery is less than a preset voltage value x by setting a value in an interrupt register to an interrupt indication,
   wherein 2.35 Volts (V)<x<3 V, and
   wherein the control device is configured to:
      control the battery to stop supplying power to the UFS when a duration for which the voltage of the battery is less than the preset voltage value x is greater than or equal to preset duration t based on the interrupt obtained by the coulometer, wherein 50 milliseconds (ms)<t<1 second(s);
      set the value in the interrupt register to the non-interrupt indication after a preset interval time A, when the value in the interrupt register changes from a non-interrupt indication to the interrupt indication; and
         control the battery to stop supplying power to the UFS when a total duration of B consecutive interrupts obtained is less than or equal to the preset duration t, wherein B>1.

2. The electronic device of claim 1, wherein (B−1)×A≤t<B×A.

3. The electronic device of claim 1, wherein 2.5 V<x<2.8 V.

4. The electronic device of claim 1, wherein x=2.6 V.

5. The electronic device of claim 1, wherein t=100 ms.

6. The electronic device of claim 1, wherein B=3.

7. The electronic device of claim 1, further comprising a system load, wherein the system load comprises the UFS, wherein the control device is electrically connected to the system load, wherein the control device is configured to control the battery to supply power to the system load, and wherein the control device controlling the battery to stop supplying power to the UFS comprises controlling the battery to stop supplying power to the system load.

8. The electronic device of claim 7, wherein controlling the battery to stop supplying power to the system load comprises triggering the electronic device to enter a shutdown process.

9. The electronic device of claim 7, wherein controlling the battery to stop supplying power to the system load comprises triggering the electronic device to enter a shipping mode.

10. A method, comprising:
    supplying power to a universal flash storage (UFS);
    sensing the voltage of the battery;
    obtaining an interrupt when a voltage of the battery is less than the preset voltage value x by setting a value in an interrupt register to an interrupt indication, wherein 2.35 Volts (V) <x <3 V
    stopping supplying power to the UFS when a duration for which the voltage of the battery is less than the preset voltage value x being greater than or equal to the preset duration t based on the otained interrupt, wherein 50 milliseconds (ms) <t <1 second(s);
    setting the value in the interrupt register to the non-interrupt indication after a preset interval time A, when the value in the interrupt register changes from a non-interrupt indication to the interrupt indication; and
    stopping supplying power to the UFS when a total duration of B consecutive interrupts obtained is less than or equal to the preset duration t, wherein B>1.

11. The method of claim 10, wherein a system load comprises the UFS, wherein the method further comprises supplying power to the system load, and wherein stopping supplying power to the UFS comprises stopping supplying power to the system load.

12. The method of claim 10, wherein (B−1)×A≤t<B×A.

13. The method of claim 10, wherein B=3.

14. The method of claim 10, wherein 2.5 V<x<2.8 V.

15. The method of claim 10, wherein x=2.6 V.

16. The method of claim 10, wherein t=100 ms.

* * * * *